Jan. 25, 1966  F. GABOURY ETAL  3,231,067
OVERHEAD CONVEYER TROLLEY
Filed Nov. 4, 1963  2 Sheets-Sheet 1
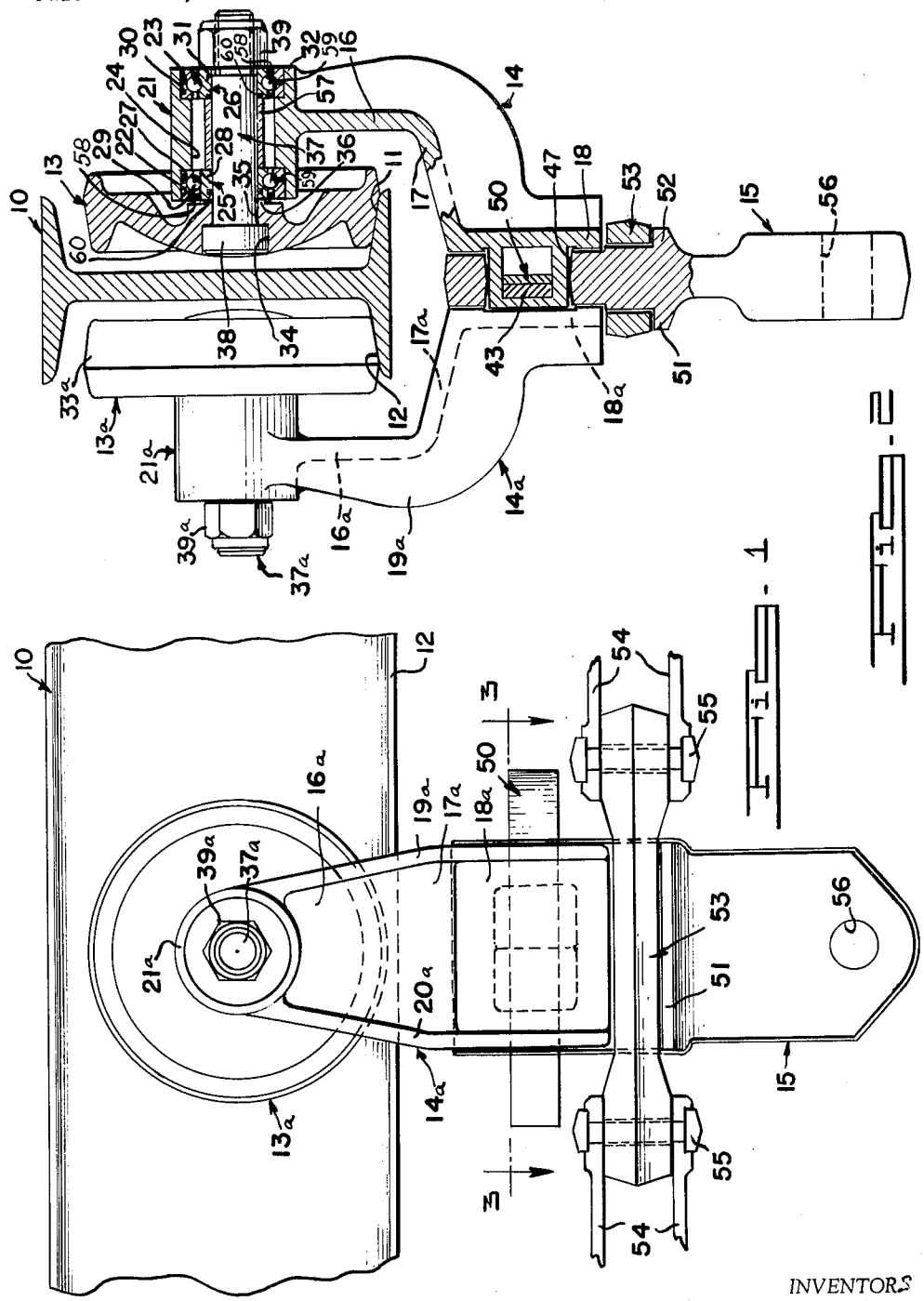
INVENTORS
EUGENE GABOURY
BY FERNAND GABOURY
Donnelly, Mentag & Harrington
ATTORNEYS Jan. 25, 1966   F. GABOURY ETAL   3,231,067
OVERHEAD CONVEYER TROLLEY
Filed Nov. 4, 1963   2 Sheets-Sheet 2
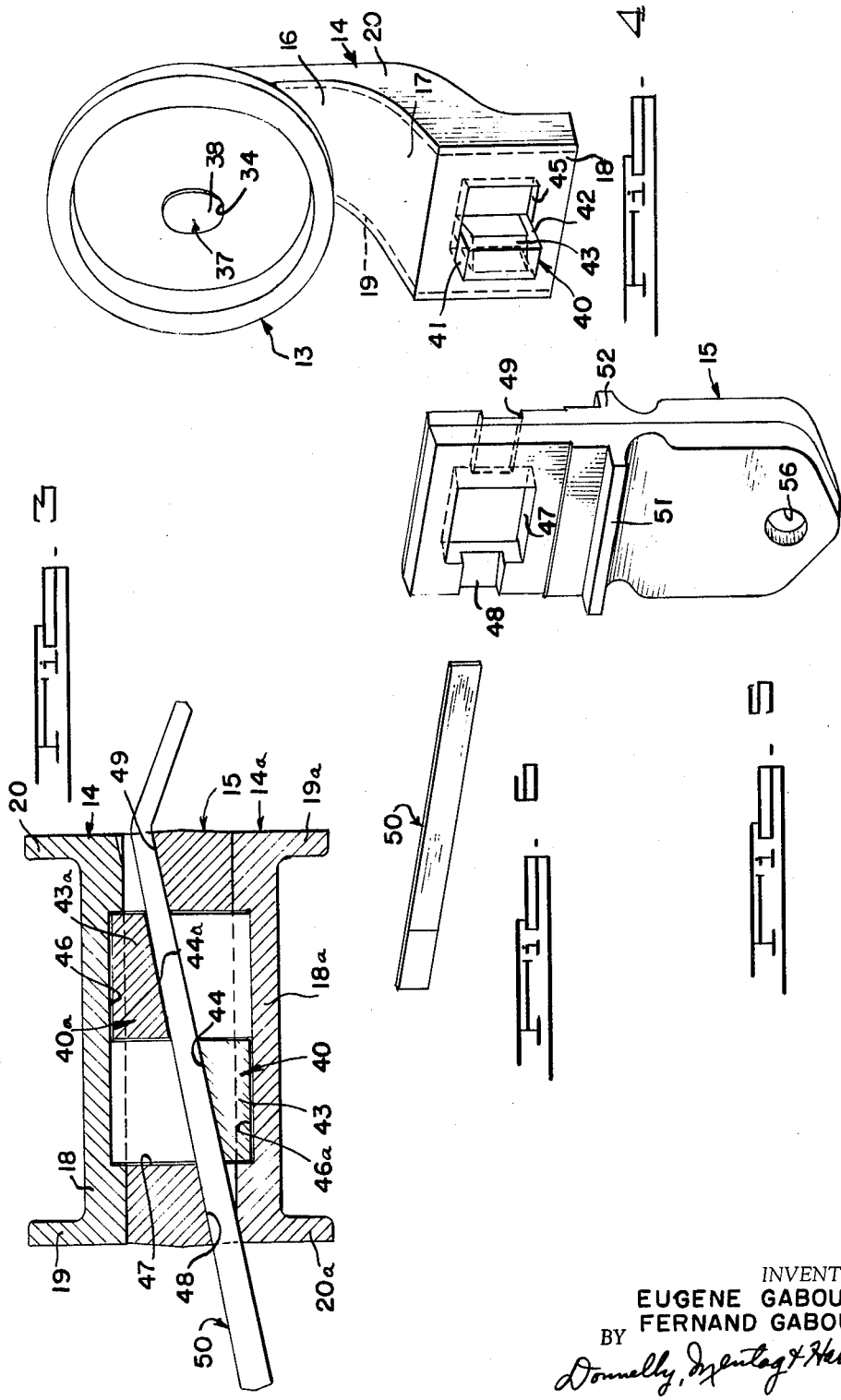
INVENTOR.
EUGENE GABOURY
BY FERNAND GABOURY
ATTORNEYS

United States Patent Office 3,231,067
Patented Jan. 25, 1966

3,231,067
OVERHEAD CONVEYER TROLLEY
Fernand Gaboury, 876 Crest, Mount Clemens, Mich., and Eugene Gaboury, 3050 Alvina, Warren, Mich.
Filed Nov. 4, 1963, Ser. No. 321,192
2 Claims. (Cl. 198—177)

This invention relates to new and useful improvements in trolleys, and more particularly to an improved conveyer trolley for chain conveyers.

The prior art conveyer trolleys have all been constructed so as to require a greasing of the trolley wheel bearings approximately once every revolution around the conveyer system. This greasing requirement is a disadvantage because there is always danger of the grease leaking out of the grease fittings and holes in the trolley wheel structure and dripping downwardly onto the workpieces or parts being carried by the conveyer so as to damage the same. This dripping of the grease from the conveyer trolleys is a serious problem in the automotive industry where the conveyer is carrying newly painted automobile bodies into a baking oven. When grease drops onto a newly painted automobile body as it passes into the oven, the grease is baked into the paint and that particular body must then be reworked with a resultant additional expense. Another disadvantage of the prior art conveyer trolleys is that there is danger of the trolley wheels binding and freezing-up due to the prior bearing constructions and alignment structure for aligning each pair of trolley wheels. A further problem encountered in the prior art conveyer trolleys is the problem of excessive friction and wear due to misalignment of the pair of trolley wheels.

Accordingly, in view of the foregoing it is the primary object of the present invention to provide a novel and improved conveyer trolley which is constructed to eliminate any need for greasing the trolley wheels once they have been installed in a conveyer system.

It is another object of the present invention to provide a novel and improved conveyer trolley construction having a pair of wheels and in which the wheels are accurately aligned so as to prevent binding and freezing-up of the wheels and resultant shut downs of entire conveyer systems which entails idleness of workers and machines supplied by the conveyer systems.

It is a further object of the present invention to provide a novel and improved conveyer trolley construction in which the wheels are completely re-usable together with the hanger arm structures, and wherein the wheels are rotatably supported by a sealed bearing, whereby the bearing is the only part which must be replaced if the bearing becomes worn, and the conveyer trolley may be repaired in a relatively simple manner and in a minimum of time.

It is still another object of the present invention to provide a novel and improved conveyer trolley which is simple and compact in construction, economical of manufacture, and efficient and trouble-free in operation.

It is a still further object of the present invention to provide a novel and improved conveyer trolley construction which incorporates a pair of wheels which are accurately aligned so as to provide true rolling action on a track in a conveyer system, and which wheels are adapted to carry heavy loads with evenly distributed wear in the conveyer system and with a minimum of friction.

It is a still further object of the present invention to provide a novel and improved conveyer trolley which incorporates a pair of opposed hanger arms having mutually confronting feet portions on the lower ends thereof and spaced upper portions on the upper ends thereof, a hub carried on the upper end of each of the hanger arms, a pair of sealed bearing members in each of the hubs; each of said bearing members including a fixed race member and a rotatable race member, a wheel disposed on the inner side of each of the hub members, a stud fixedly connecting each of said wheels to the adjacently disposed race members of said bearing members, and said studs being disposed on a common longitudinal axis.

It is a still further object of the present invention to provide a novel and improved conveyer trolley, including a pair of opposed hanger arms carrying a wheel on each of the upper ends thereof, a parts carrier hanger arm disposed between the lower ends of said first-mentioned hanger arms, means connecting said hanger arms together including a keeper on the lower end of each of said first-mentioned hanger arms and extending through an opening in the upper end of the parts carrier hanger arm and into a recess in the opposite first-mentioned hanger arm, and a key interposed between the lower portions of the first-mentioned hanger arms and the upper portion of the parts carrier hanger arm and engaging the keepers to lock the hanger arms in fixed unitary relation.

Other objects, features and advantages of this invention will be apparent from the following detailed description, appended claims, and the accompanying drawings.

In the drawings:

FIG. 1 is a side elevational view of a conveyer trolley construction made in accordance with the principles of the present invention, and a portion of a chain conveyer;

FIG. 2 is an end elevational view of the structure illustrated in FIG. 1, shown partially in vertical cross section;

FIG. 3 is an enlarged, horizontal sectional view of the structure illustrated in FIG. 1, taken along the line 3—3 thereof, and looking in the direction of the arrows;

FIG. 4 is a perspective view of one of the wheel-mounting hanger arms employed in the structure of FIG. 1;

FIG. 5 is a perspective view of a chain-engaging parts carrier hanger arms; and, FIG. 6 is a perspective view of the key used to interlock the hanger arms of the conveyer trolley.

Referring now to the drawings and in particular to FIGS. 1 and 2, the numeral 10 generally designates the usual I-beam track of an overhead trolley conveyer system. The lower flanges 11 and 12 of the I-beam 10 form a runway or track surface for a pair of laterally spaced apart trolley wheels generally indicated by the numerals 13 and 13a. The trolley wheels 13 and 13a are carried by a pair of hanger arms which are similarly constructed. Accordingly, the hanger arm structure which carries trolley wheel 13 will be described in detail, and the similar parts of the hanger arm which carries the trolley wheel 13a will be marked with corresponding reference numerals followed by the small letter "a."

As shown in FIGS. 1 and 2, the trolley wheels 13 and 13a are rotatably supported on the hanger arms 14 and 14a, respectively, which are detachably connected at the lower ends thereof, as more fully described hereinafter. The hanger arms 14 and 14a carry the parts carrier hanger arm generally indicated by the numeral 15.

As shown in FIGS. 2 and 4, the hanger arm 14 comprises an upper end portion which is made in the form of a plate 16 which is disposed parallel with the track 10. The hanger arm 16 is laterally spaced apart outwardly from the track 10 and it is integrally formed with an intermediate hanger arm portion 17 which is also shaped as a plate and slopes inwardly and downwardly under the conveyer track 10. The hanger arm 14 further includes the vertically disposed foot portion 18 which is shaped as a vertical plate with its inner face disposed parallel to the inner surface of the upper plate-like portion 16. The inner surface of the foot portion 18 is also disposed parallel to the vertical axis of the track 10, but offset outwardly thereform. Hanger arm 14 further includes the pair of laterally spaced apart stiffener flanges 19 and 20 which are intergrally formed with the hanger arm portions 16, 17 and 18 along the outer edges thereof. The stiffener flanges 19 and 20 extend readwardly outwardly and perpendicularly from the hanger portions 16, 17 and 18. As shown in FIG. 1, the side edges of the hanger arm portions 16 and 16a slope inwardly and upwardly.

A hub 21 is integrally mounted on the upper end of the hanger arm portions 16, 19 and 20. The hub 21 is cylindrically formed and is connected to the hanger arm plate portion 16 at a substantially central point relative to the longitudinal axis of the hub. As shown in FIG. 2, the hub 21 is provided with a bearing seat or annular recess 22 on the inner end thereof, and a similar recess 23 on the outer end thereof. The recesses 22 and 23 are connected by the reduced diameter bore 24.

Operatively mounted in the hub recesses 22 and 23 are the sealed bearings, generally indicated by the numerals 25 and 26, respectively. The bearings 25 and 26 may be of any suitable type, as for example, the type put in sealed electric motors. As shown in FIG. 2, an annular seal member 58 is operatively mounted between the inner and outer races of bearing 25. Suitable annular seal members, as O-rings, 59 and 60, in the outer and inner races 30 and 31, respectively, serve to prevent seepage of lubricant out of the bore 24. Bearing 26 is provided with similar seal members. Such bearings are provided with lubrication sealed inside thereof and they normally last for the lifetime of the product in which they are used. These bearing do not require any greasing during use and if they become worn they may be quickly and easily replaced. One suitable sealed bearing which may be employed is a ball bearing available on the market from the Nice Bearing Service Company of Philadelphia, Pennsylvania, Model No. 1630.

As shown in FIG. 2, the bearing 25 includes a fixed race 27 and the race 28, between which is operatively mounted a suitable anti-friction means, as for example, the ball bearings 29. The bearing 26 is similarly formed and includes the fixed race 30 in which is rotatably mounted the race 31, by suitable anti-friction means, as the balls 32.

The trolley wheels 13 and 13a are provided with the converging track engaging surfaces 33 and 33a, which are adapted to roll on the outwardly sloping track flanges 11 and 12, respectively. As shown in FIG. 2, the wheels 13 and 13a are supported by the hanger arms 14 and 14a, in a substantially vertical plane, and in axial alignment with each other. The wheel 33 is provided with an axial recess 34 on the outer side thereof. The recess 34 communicates with the stud or shaft bore 35 which extends through the inner side of the wheel. The wheel 13 is provided with the hub portion 36 which is adapted to seat on the outer face of the bearing race 28.

As shown in FIG. 2, a stud 37 is adapted to fixedly secure the wheel 13 to the race members 28 and 31 of the bearings 25 and 26, respectively. The stud or shaft 37 is provided with the enlarged head 38 which is adapted to be seated in the wheel recess 34. The stud 37 passes through the wheel bore 35 and through the race 28, spacer 57, and then through race 31. The spacer 57 functions to maintain proper bearing race spacing between the races 28 and 31. The stud 37 fits into the wheel bore 35 and the inner diameters of the races 28 and 31 within close tolerances or limits so as to provide an accurate concentric disposition between the wheel 13 and the races 28 and 31. As shown in FIG. 2, the outer end of the stud 37 is reduced and threaded and extends outwardly of the hub 21. A suitable lock nut 39 is threadably mounted on the outer threaded end of the stud 37 and engages the outer side of the race 31 so as to fixedly secure the wheel 13, the stud 37, the races 28 and 31, and the nut 39 into a fixed unitary relationship. It will be seen that the wheel supporting studs 37 and 37a are disposed on the same longitudinal axis so as to maintain the wheels 13 and 13a in axial alignment with each other and to provide a rigid wheel supporting structure to permit the wheels to roll on the track flanges 11 and 12 with a minimum of friction.

As shown in FIG. 4, the foot portion 18 of the hanger arm 14 is provided with an outwardly extended keeper, generally indicated by the numeral 40. The keeper 40 comprises an upper horizontally disposed, inwardly extended wall 41 and a downwardly spaced apart horizontal lower wall 42. The outer ends of the horizontal walls 41 and 42 are connected by a vertical, integral wall 43 which has a vertical outer face disposed parallel to the inner face of the foot portion 18. The outer upper face of the wall 41 is disposed horizontal and perpendicular to the foot portion inner surface 18 and the outer surface of the vertical wall 43. The lower outer surface of the bottom wall 42 is also disposed horizontal and parallel to the outer upper surface of the wall 41.

As shown in FIGS. 3 and 4, the inner surface 44 of the keeper outer wall 43 slopes inwardly from the outer side thereof toward the inner side thereof. The foot portion 18 of the hanger arm 14 is also provided with a substantially rectangular inwardly extended recess 45 adjacent the keeper 40 for the reception of the outer end of the wall 43a of the keeper 40a on the hanger arm 14a. It will be seen that the keepers 40 and 40a are substantially rectangular in overall configuration and laterally disposed relative to each other.

The parts carrier hanger arm 15 is preferably integrally formed and is provided with a substantially rectangularly shaped upper end. As shown in FIGS. 1 through 3, the upper end of the parts carrier hanger arm 15 is disposed between the foot portions 18 and 18a of the trolley wheel hanger arms 14 and 14a, respectively. The hanger arm 15 is provided with a transversely formed, rectangular opening therethrough indicated by the numeral 47. As shown in FIG. 3, the hanger arm opening 47 is adapted to be aligned with the keepers 40 and 40a for the reception of the same. The hanger arm opening 47 also is aligned with the recesses 46 and 46a formed in the hanger arms 14 and 14a respectively. As shown in FIGS. 3 and 5, the hanger arm 15 is provided with the rectangularly shaped grooves 48 and 49 on opposite sides thereof. The grooves 48 and 49 have the inner ends thereof communicating the the aperture 47 and they are disposed in axial alignment for the reception of a blade or locking key generally indicated by the numeral 50. The key 50 would be approximately six inches long and be tapered from one end thereof across the transverse dimension.

It will be seen that the trolley hanger arms 14 and 14a may be quickly and easily secured to the parts carrier hanger arm 15 in a minimum of time and without any special tools other than a hammer. The hanger arms are mounted together as shown in FIGS. 1, 2 and 3 so as to dispose the keepers 40 and 40a in a side-by-side relationship and with the outer ends thereof extended into the mating recesses 46 and 46a in the opposite trolley hanger arm. The key 50 is then driven through the slot 48 and the keepers 40 and 40a and thence through the slot 49. The outer end thereof may be bent over to secure the same in place. If desired, suitable other locking means may be used, as for example, cotter keys. The key 50 firmly and strongly secures the three hanger arms in assembled relation.

The parts carrier hanger arm 15 extends below the trolley wheel carrier arms 14 and 14a and is provided with a pair of horizontally disposed outwardly extended shoulders 51 and 52 to support a loop-forming link 53 of a conveyer chain. The conveyer chain is of a conventional type and further comprises paired upper and lower link members 54 of elongated plate form which are suitably swivelly connected to the link 53 by means of the headed pins 55. The lower end of the parts carrier hanger arm 15 is provided with a horizontally disposed hole therethrough as indicated by the numeral 56 for the reception of a hook or other suitable means for connecting parts or workpieces of some type to be carried by the conveyor system. The parts carrier hanger arm 50 is preferably integrally formed for strength purposes.

It will be seen that the two spaced apart bearings 25 and 26 in the hub 21 provides a strong and rigid structure for supporting the wheel 13. The spaced apart bearing construction provides an increased bearing area over the prior art type conveyor, wheel shafts, as for example, the shaft supporting structure of reissue Patent No. 23,658 issued on May 19, 1953. The spaced apart supporting areas of the bearings 25 and 26 help to resist turning moments which may be created on the wheel 13 by heavy loads.

The improved detachable interlocking connection means for the three hanger arms maintains the studs or shafts of the trolley wheels 13 and 13a and substantially the same longitudinal axis whereby the wheels track in a more efficient manner without crossing so as to produce rubbing on the track flanges 11 and 12. The wheels 13 and 13a are held in aligned and concentric positions with each other so as to provide true rolling action on the track flanges 11 and 12 and avoid excessive friction and wear.

As compared to prior art trolley wheels, it will be seen that the wheel bearing has been removed from the conveyor wheel itself and it is mounted in the hub structure 21. The structure of the present invention permits the use of a stronger wheel because of the removal of the bearing from the wheel itself and mounting in the hub 21. The wheel does not have to cut away to provide any bearing housing and the only opening therethrough which is required for the wheel shaft or stud 37. Because of the novel structure, there is no bearing friction on the wheel which may wear and any bearing wear is taken up in the bearings 25 and 26. Because of this structure, the wheels and the carrier arms are completely reusable or salvageable because if the bearing races 27 and 30 wear, they may be quickly and easily replaced in the same trolley wheel and hanger arm structure. It will be seen that maintenance costs are materially reduced to a minimum.

The sealed bearing construction employed in the trolley wheel structure of the present invention, eliminates the need for any periodic greasing of the same whereby the disadvantage of the prior art devices of grease dripping on parts carried by the conveyer system is eliminated. The self-sealing bearings employed in the present construction, also eliminates the danger of the wheels binding and freezing-up if proper greasing is not carried out as is required by the prior art structures.

It will be seen that the keepers 40 and 40a nest in the recesses 46 and 46a to provide a precision hanger arm assembly whereby the trolley arms are connected in accurate disposition relative to each other and in a quick and easy manner. Experience and ready acceptance of the conveyer wheel structure of the present invention has shown that it economical and efficient in operation.

While it will be apparent that the preferred embodiment of the invention herein disclosed is well calculated to fulfill the objects above stated, it will be appreciated that the invention is susceptible to modification, variaion and change without departing from the proper scope or fair meaning of the subjoined claims.

What we claim is:

1. A conveyer trolley for use on a conveyor track comprising: a pair of opposed hanger arms having mutually confronting feet portions on the lower ends thereof and spaced apart upper portions on the upper ends thereof; each of said hanger arms including an upper end portion made in the form of a vertical plate and disposed parallel to the track; a hub integrally mounted on the upper end of each of the hanger arm plate portions; each of said hubs being disposed with its longitudinal axis perpendicular to its respective hanger arm plate portion and connected thereto at a substantial central point relative to the longitudinal axis of the hub; a recess formed on inner and outer ends of each of said hubs; a stud hole connecting said recesses in each of said hubs; a sealed bearing member in each of the recesses in each of said hubs; each of said bearing members including a fixed outer race and a rotatable inner race; a trolley wheel disposed on the inner side of each of the hubs; each of said trolley wheels adapted to roll one one side of the track and having an axial bore; the inner end of the axial bore which faces the track in each wheel being enlarged to form a recess and seat for the head of a stud; each of said wheels being provided with an integral axial hub which is seated against the outer face of the inner race of the bearing member in the recess in the inner end of the hub on the adjacent hanger arm; the axial bore in each wheel extending through the wheel hub and communicating with the stud hole in the adjacent hanger arm; a stud having an enlarged head mounted through the axial bore in each wheel and through the stud hole in the adjacent hanger arm hub for connecting each of said trolley wheels to the inner race members of the bearing members in the adjacently disposed hanger arm hub; said studs being aligned on a common longitudinal axis; the head on each stud being seated in the enlarged recess of each wheel axial bore and each stud being threaded on the end opposite said head; a nut mounted on the threaded end of each stud and being seated against the outer face of the outer race of the bearing member in the recess in the outer end of the hub on the adjacent hanger arm for securing the wheel, stud and nut to the inner races of the bearing members in the adjacent hanger arm; and, means detachably connecting the feet portions of said hanger arms together.

2. A conveyer trolley for use on a conveyer track comprising: a pair of opposed hanger arms having mutually confronting feet portions on the lower ends thereof and spaced apart upper portions on the upper ends thereof; each of said hanger arms including an upper end portion made in the form of a vertical plate and disposed parallel to the track; a hub integrally mounted on the upper end of each of the hanger arm plate portions; each of said hubs being disposed with its longitudinal axis perpendicular to its respective hanger arm plate portion and connected thereto at a substanital central point relative to the longitudinal axis of the hub; a recess formed on inner and outer ends of each of said hubs; a stud hole connecting said recesses in each of said hubs; a sealed bearing member in each of the recesses in each of said hubs; each of said bearing members including a fixed outer race and a rotatable inner race; a trolley wheel disposed on the inner side of each of the hubs; each of said trolley wheels adapted to roll on one side of the track and having an axial bore; the inner end of the axial bore which faces the track in each wheel being enlarged to form a recess and seat for the head of a stud; each of said wheels being provided with an integral axial hub which is seated against the outer face of the inner race of the bearing member in the recess in the inner end of the hub on the adjacent hanger arm; the axial bore in each wheel extending through the wheel hub and communicating with the stud hole in the adjacent hanger arm; a stud having an enlarged head mounted through the axial bore in each wheel and through the stud hole in the adjacent hanger arm hub for connecting each of said trolley wheels to the inner race members of the bearing members in the adjacently disposed hanger arm hub; said studs being aligned on a common longitudinal axis; the head on each stud being seated in the enlarged recess of each wheel axial bore and each stud being threaded on the end opposite said head; a nut mounted on the threaded end of each stud and being seated against the outer face of the outer race of the bearing member in the recess in the outer end of the hub on the adjacent hanger arm for securing the wheel, stud and nut to hanger arm; means detachably connecting the feet portions of said hanger arms together; a parts carrier hanger arm disposed between the feet portions of said first-mentioned hanger arms and being provided with a transverse opening through the upper end thereof which is disposed between said feet portions; having a loop keeper formed on the lower end of each of said first-mentioned hanger arms and extending from opposite directions through said openings in the parts carrier hanger arm and into nesting engagement in a recess in the oppositely disposed first-mentioned hanger arms; each loop having a sloping inner face; and, a key interposed between the feet portions of the first-mentioned hanger arms and engaging the sloping face of the loops of the keepers and the upper end of said parts carrier hanger arm to lock the hanger arms in fixed unitary relation.

References Cited by the Examiner

UNITED STATES PATENTS

| | | | |
|---|---|---|---|
| Re. 23,658 | 5/1953 | Gaboury | 198—17 |
| 2,841,830 | 7/1958 | Burris | 308—189 |
| 2,861,850 | 11/1958 | Nyblom | 105—154 |
| 2,897,769 | 8/1959 | Bishop et al. | 198—177 |
| 2,956,632 | 10/1960 | Forbush et al. | 308—189 |

JOSEPH D. SEERS, *Primary Examiner.*

BOBBY R. GAY, *Examiner.*